United States Patent [19]

Oberländer et al.

[11] Patent Number: 5,794,403
[45] Date of Patent: Aug. 18, 1998

[54] FIREPROOF TRANSPARENT PANE PANEL

[75] Inventors: Klaus Oberländer, Hanau; Norbert Brand, Darmstadt; Winfried Belzner, Gründau, all of Germany

[73] Assignee: Degussa Aktiengesellschaft, Germany

[21] Appl. No.: 733,699

[22] Filed: Oct. 17, 1996

[30] Foreign Application Priority Data

Oct. 21, 1995 [DE] Germany ............. 195 39 214.0

[51] Int. Cl.⁶ .............................................. A47G 1/00
[52] U.S. Cl. ............... 52/786.11; 52/788.1; 52/309.1; 528/34
[58] Field of Search ............... 52/786.11, 788.1, 52/790.1, 791.1, 796.1, 309.1, 309.13, 309.3, 309.15; 428/34, 38

[56] References Cited

U.S. PATENT DOCUMENTS 3,666,614  5/1972  Snedecker et al. .
5,040,352  8/1991  Oberländer et al. .

FOREIGN PATENT DOCUMENTS 0407852  7/1990  European Pat. Off. .
4326232  8/1993  Germany .

Primary Examiner—Creighton Smith
Attorney, Agent, or Firm—Pillsbury Madison & Sutro LLP

[57] ABSTRACT

A fireproof transparent pane panel is disclosed which comprises a plastic pane core disposed between panes of inorganic glass. Support elements in the form of plastic threads or strips, arranged unidirectionally or in a lattice, are embedded within the core.

29 Claims, 3 Drawing Sheets

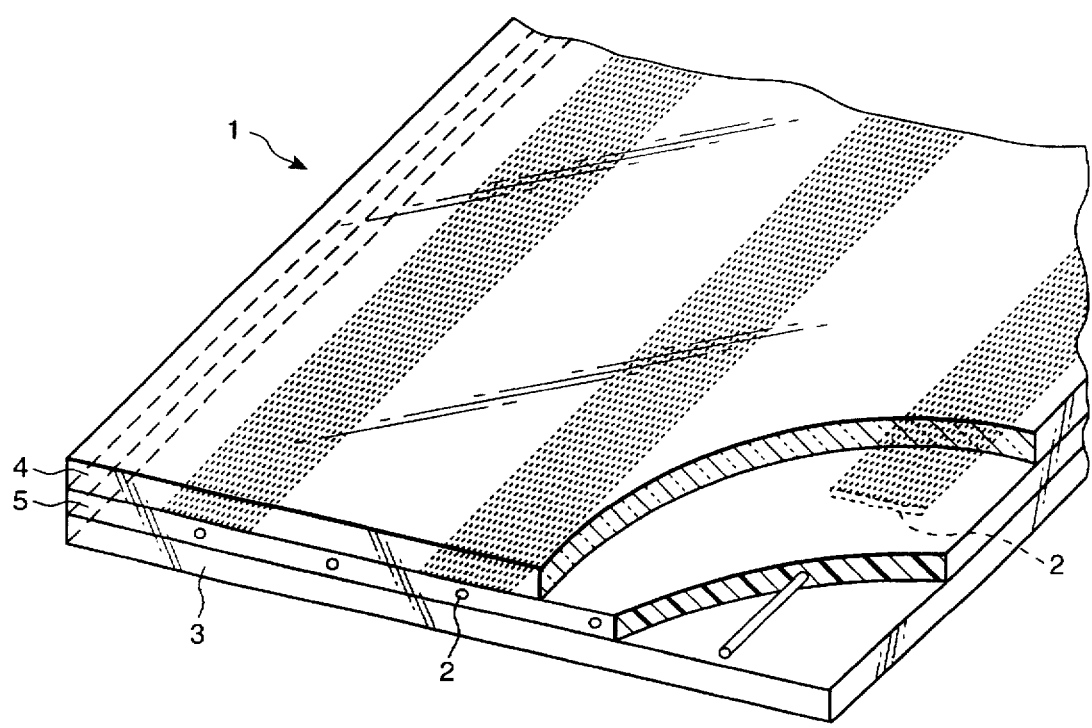

FIREPROOF TRANSPARENT PANE PANEL

This application claims priority from German Application No. 195 39 214.0, filed on Oct. 21, 1995, the subject matter of which is incorporated herein by reference.

BACKGROUND OF THE INVENTION

1. Field of the Invention

The invention relates to a transparent pane panel which incorporates a plastic pane which is used as a noise-prevention element. More particularly, the invention relates to improving the combustion properties of a transparent pane panel comprising a transparent plastic pane with embedded monofilament plastic threads and adapted to prevent or reduce the production and falling-out of loose fragments when the plastic pane is broken.

Plastic noise-prevention walls are known, e.g., from EP 0 407 852 A2 ($\cong$ U.S. Pat. No. 5 040 352). Plastic panes of this known kind are excellent in fulfilling their purpose, i.e., preventing the occurence, and falling-out, of loose fragments. In addition, strips, ornaments or designs can be embedded in the plastic panes in order to protect birds.

Austrian Patent Specification 263 298 discloses a translucent structural panel in which a partially metallised fabric is cast. The fabric reinforces the structural panel but in the event of breakage cannot prevent the production of individual fragments, since in the event of breakage the fabric breaks together with the plastic structural panel, owing to the high strength of the material of which the panel is made. In addition, the fine openings to admit light in the fabric prevent the structural panel from being transparent, so that the panels are of use only as lighting elements but not as panes. Also, the metallised fabric may produce reflexes or reflections which are disturbing and also may simulate non-existent transparency on one side.

DE-U-84 35 283 discloses transparent structural panels wherein individual parts produced in the event of a breakage are secured and trapped by external cables. The fragments covered by the invention are relatively large and can break into other, still relatively large, loose pieces. Conventional stripes or the like can be formed on these known plates, e.g., to protect birds.

"Schweizer Ingenieur und Architekt", No. 13, 1988, pages 379 and 380, discloses noise-preventing panes which in the event of fracture disintegrate into loose fragments. To protect birds, the panes can be etched, e.g. in vertical strips 5 mm wide. This additional complication is expensive, increases the risk of dirtying the pane and is unattractive in appearance.

DE 43 26 232 A1 discloses composites of incompatible plastics, wherein at least two incompatible plastics are co-extruded with good adhesion between the layers of the multi-layer plastic composite. Apart from the continuous manufacture, the cited composite members do not differ from the elements known, e.g., from EP 0 407 852 A2. In both cases a reinforced plastic element is obtained, either discontinuously by casting or continuously by co-extrusion, without an additional primer between the two plastics, and in the event of breakage of the matrix (preferably acrylic glass) the construction is characterised by the capacity of the second plastic material to hold the resulting fragments together. This retention of splinters is based on the capacity of the embedded plastic fibres to stretch without tearing, thus holding fragments of the matrix together.

As a result of the previously-mentioned properties, transparent noise-prevention elements of acrylic glass are often preferred to other materials when constructing noise-prevention walls on public traffic areas.

In the event of impact by a vehicle on a noise-prevention panel of this kind, there is much less risk that it will shatter and that fragments will fall on the road, but all hitherto-known plastic units cited herein still have various disadvantages, some serious.

For example, in the specific case of impact of a vehicle, there is serious risk that the plastic units will catch fire, since their matrix is made of combustible plastics. The danger from noise-prevention elements burning is almost more serious than from flying splinters. On the other hand, fire-proofing of the plastic matrix is either relatively expensive or adversely affects other properties, such as transparency. There is therefore an urgent need for noise-prevention panels with increased fireproofing.

In addition, known noise-prevention units made of acrylic glass frequently become scratched when cleaning the surfaces, which become dirty relatively easy, and this also adversely influences the service life of the panels. If the noise-prevention units are not cleaned, on the other hand, they gradually become unsuitable as transparent elements. If the panels are given a scratch-proof coating, they can be cleaned with brushes or the like, but the scratch-proof coating is relatively expensive. Consequently there is an urgent need for an easily-cleaned, cheap noise-prevention element.

Finally, known noise-prevention units have the defect of frequently having relatively low resistance to bending. The result is either that in known devices the spacing between securing uprights has to be kept relatively small, or, in the case of "upwardly free-standing" systems, the upper edge of the panel sags to a dangerous extent. This may in some cases result in breakage of the entire unit. Otherwise the dimensions of the units will be unnecessarily restricted.

Composite panes wherein a plastic pane in the form of a sheet or adhesive layer being disposed between inorganic glass panes are known from DE 25 55 382 A1, DE-OS 22 57 741 and DE 42 00 354 A1.

For example, DE 25 55 382 A1 relates to insulating panes made of two or more glass panes stuck together by a resin, the resin being a copolymer of polyesters and vinyl resin monomers.

DE-OS 22 57 741 discloses soundproofing panels wherein two glass panels as before are adhered by means of a synthetic resin, which forms a thin film joining the two glass panes.

DE 42 00 354 A1 uses reduced-yellowing (meth)acrylate resins for producing composite glass.

SUMMARY OF THE INVENTION

The object of the invention is a pane panel based on transparent plastic panes of the kind described above but having improved combustion properties without giving up the advantageous properties of the known noise-prevention units. The improved pane panel also is simple to clean, more particularly by machinery such as rotating brushes or the like, without risk of scratching the sensitive surfaces, and has greater resistance to bending so that the walls can be designed with longer spaces between uprights than heretofore possible.

The pane panel is in the form of a composite pane with a plastic pane core disposed between two panes of inorganic glass, the result being a composite material which has all the advantages of the known elements, especially the advantage of splinter retention after fracture, but it is also practically incombustible under the conditions of use, is highly rigid and particularly resistant to bending, is made only of plastic in contrast to noise-prevention units of equal thickness, and has surfaces with increased resistance to scratching and is consequently also easy and inexpensive to clean by machinery.

Plastic panes embedded between two inorganic glass panes are known per se. The plastic serving as the "matrix" of the fibrous elements is a thermoplastic which is preferably amorphous and also preferably has the same or a smaller thermal expansion coefficient than the plastic forming the inner threads, strips, lattices or networks, which can be amorphous, partly crystalline or crystalline.

Preferably the inner plastic (fibrous elements) has a greater elongation at tear, greater shear strength and higher viscosity than the matrix plastic.

The following are examples of amorphous plastics A or B: polyvinyl esters, polyvinyl ethers, amorphous polyvinyl halides, polystyrenes, polyphenylene oxides, polyphenylene sulphides, polycarbonates, polysulphones, amorphous polyamides, polyether ketones, polyether ether ketones, polyether sulphones, polyimides, polyether imides, polyfluoroalkenes, polyester carbonates, amorphous polyolefins and particularly preferably poly(meth)acrylates. The crystalline or partly crystalline plastics B can e.g. be polymers in which the crystallinity is determined by uniform tacticity or sufficiently small substituents, so that a crystal lattice can form at least partially. The following are examples: polyesters, crystalline polyolefins, crystalline polyvinyl halides, liquid-crystal polymers with mesogenic groups in the main and/or side chain, or particularly preferably crystalline polyamides. For production and properties of plastics A and B see e.g. Kirk-Othmer, Encyclopedia of Chemical Technology, 3rd Edition, Volume 18, pages 720 to 755, Wiley Interscience, 1982.

These plastic panels can be produced in any manner familiar to a person of ordinary skill in the art.

In the preferred embodiment the plastic pane, forming the core of the composite pane, can be obtained by a discontinuous casting process. The process, for example, can be as follows:

A chamber is formed from two prefabricated cast plastic panels, e.g., acrylic glass panels (2000 mm×1220 mm×8 mm) using a peripheral seal 4 mm thick. Monofilament, plastic threads, e.g., polyamide threads having a diameter of 0.9 mm, are clamped in the chamber, approximately centrally at intervals of 30 mm and parallel to one another. A low-viscosity cold-setting methacrylate resin containing a redox initiator system and an outer plasticiser based on a citric acid ester is then poured into the chamber.

After complete hardening of the intermediate layer, the result is a plastic pane suitable as a core of the composite pane.

Alternatively and specially advantageously, the plastic pane forming the core of the composite pane according to the invention is produced by continuous co-extrusion of two incompatible thermoplastics.

Preferably the plastic is supplied through a co-extrusion nozzle to the feed places and then distributed through two separate ducts to obtain a product having the desired width. Between the distribution ducts for the plastic, the plastic for embedding is supplied to a transverse distribution bore at the feed place. The plastic for embedding leaves the transverse distribution bore through a relatively large number of bores corresponding to the number of segments of the material in the matrix.

At the place where the plastic for embedding comes out of the bores, the two layers of matrix plastic are brought together and thus surround the strands of plastic for embedding.

The cross-sectional shape of the plastics for embedding in the matrix depends mainly on the shape of the bores in the running-out region and the viscosity of the matrix plastic relative to that of the plastic for embedding. If the viscosity of the plastic for embedding is greater than the viscosity of the matrix, the segments will be rather round in cross-section, or flat in the contrary case.

After leaving the nozzle, the composite can be calibrated in a conventional calender stack. Since the plastic for embedding is enclosed in the matrix plastic, it cools relatively slowly. The result, in the case of a partly crystalline or crystalline plastic for embedding, is that the degree of crystallinity reached is substantially higher than in conventional extrusion of the strands of material for embedding.

If there is a requirement for lengthwise periodic change in the cross-section of the segments of material for embedding, this can be achieved in simple manner by periodically altering the flow rate at the feed place. Since the plastic for embedding has higher thermal expansion than the matrix plastic, the segments of the plastic for embedding will also be prestressed (comparable with reinforced concrete) in conjunction with the positive connection between the two plastics. This permits a further improvement in the mechanical properties of the composite.

The plastic threads embedded in the composite plastic pane can be disposed so as to extend parallel to one another in only one direction or so that they extend parallel to one another in two directions. In the latter case the two directions can include an angle of 90° or one different from 90°. If plastic strips are embedded, they are advantageously disposed so as to extend parallel to one another in one direction only.

In a particular embodiment, the inner plastic fibres are of high-contrast and thus have a bird-protecting effect.

In high-contrast plastic fibres, the transmission factor of the plastic used for their production is between 0 and 65% (measured to DIN 5033 Chromatometry and 5036 Physical Radiation and Lighting Properties of Materials). Preferably the material or the plastic threads themselves have a transmission factor of 0 to 30%, particularly 0 to 10%. A transmission factor of about 0% is particularly advantageous. It is advantageous to use dark threads, particularly black ones. Owing to the high-contrast threads, flying birds recognise a transparent wall of this kind as an obstacle, in good time and at a distance of several metres, and can fly round the plastic wall accordingly.

In particularly advantageous embodiments, the plastic threads are 1 mm to 5 mm thick. The thickness range from 1.8 mm to 3.0 mm, preferably 2.0 mm to 2.5 mm, has been found particularly advantageous with regard to the required properties, easy insertion into the plastic pane, sufficient strength in the event of fracture, sufficient bird protection and no substantial impairment of the overall transparency of the pane.

Usually the threads in the plastic pane run horizontally, since the panes are clamped at the side, resulting in particularly advantageous cohesion in the event of fracture. The threads also are usually laid parallel to one another. If desired or necessary, two layers of threads can be incorporated in the pane, preferably extending in two directions, an angle of 90° between threads in different layers being particularly advantageous. An embodiment of this kind, considered from the exterior, looks like a lattice fabric.

Usually the spacing between neighbouring threads is chosen at not more than 100 mm. Above this value, there is a marked impairment of bird protection or retention of fragments. A thread spacing up to 50 mm is preferable, particularly when the threads extend horizontally, since birds apparently recognise horizontal obstacles less clearly than vertical obstacles.

The density per unit area of high-contrast fibres, i.e., the percentage of the surface of the entire plastic pane covered by the fibres, is usually from 2.5 to 25%. Preferably, particularly with horizontal threads, the density per unit area is at least 5%, preferably 6 to 10%. In the case of vertical threads the density per unit area can be somewhat smaller, so that in this case the preferable range is around 5 to 8%. Below this density per unit area, the bird protection is rapidly impaired, whereas above these values the threads remain visible, even at a large distance, and consequently look unattractive, i.e., the advantageous translucency of the plastic pane is largely lost.

Typical pane thicknesses are 5 to 40 mm, preferably 12 to 25 mm. The panes are usually supplied in sizes from 1.5 m×1 m to 2 m×3 m. Larger or smaller embodiments are possible for special uses.

The panes are normally substantially a clear see-through (transparent) type, preferably colourless or slightly tinted, e.g. smoke-brown. The colourless, perfectly transparent plastic panes usually have a transmission factor of at least 70%; a transmission of 90 to 95% being advantageous. Tinted embodiments usually have a transmission factor of 45 to 75%, normally between 50 and 60%. The absorption of the threads is added to the absorption of the tinted pane, so that the threads are also high-contrast elements which are recognisable.

Among the previously-mentioned materials for the plastic pane core, acrylic glass and polycarbonate are preferred.

Particularly advantageously, the invention is characterised in that the plastic pane is made of acrylic glass, in which case the plastic core preferably comprises embedded polyamide threads.

The main characteristic of the invention is that the plastic pane forms the core of the composite pane and is disposed between two panes of inorganic glass.

Although the inorganic glass material is not in itself subject to any particular limitations, embodiments are preferred where adequate, high adhesion can be achieved between the glass panes and the plastic pane core.

Surprisingly, success has been obtained in adjusting the adhesion between preferably inorganic float glass or single-pane safety glass on the one hand and a plastic core pane on the other hand so that the splinter-retention effect of the core, in the event of a fracture, also extends to the glass components of the composite. In other words, if the entire structure breaks up, components of the inorganic glass panes are prevented from flying around, in addition to retention of splinters from the plastic pane core.

Normally a large number of different kinds of glass can be used as a component in the composite panes according to the invention. Usable inorganic glass includes float glass and mirror glass, both preferably hardened to form single-pane safety glass.

Among the said kinds of glass, single-pane safety glass in the form of float glass is particularly preferred.

The structures according to the invention can be manufactured by all methods familiar to one skilled in the art. On the one hand, the panes can be made of inorganic glass in a laminate on prefabricated plastic pane elements. This is preferably brought about by using primers, e.g., in the known method for manufacturing composite safety glass from inorganic glass. In the preferred method, the glass panes are first thoroughly cleaned, as is the plastic pane core. One or more plastic intermediate layers (e.g. sheets of polyvinyl butyral) are then placed between the plastic core and the glass pane. The structure is then compounded by compression in a rolling operation. The compressed combination is then put in an autoclave, where the glass, intermediate layers and the plastic core pane are permanently bonded together by heat and pressure. The resulting pane panel has high strength and clear undistorted transparency.

Alternatively, adequate adhesion, even during a casting process, can be obtained if the inner plastic pane is polymerised between and in contact with the glass pane. Optionally suitable substances such as organosilanes are introduced into the polymerising mixture in order to increase the adhesion.

Another alternative is to place suitable glass panes, while still hot, on plastic core panes made by co-extrusion before the panes have finally cooled, the result being adequate adhesion even without adding a primer.

In general, either symmetrical or asymmetrical structures can be produced according to the invention. In a symmetrical structure, two identical inorganic glass panes contain a plastic pane core, or in other words the core (plastic glass) is disposed between two panes (mineral glass) made of the same material. If the structure is asymmetrical, this means that two panes of inorganic glass, the glass being from different materials, form a composite according to the invention, in combination with a plastic pane core. This is a method, for example, of adapting the embodiment of the composite according to the invention to particular requirements. For example, on the side of the noise-prevention wall facing the street or rail, a single-disc safety glass panel can be provided to obtain the required protection against flying stones, whereas cheaper glazing, e.g., with float glass, can be used at the back.

The composite panes according to the invention are especially suitable for fireproof, bending-resistant, noise-prevention walls with a scratch-proof surface. Particularly preferably, the inner plastic core is designed so that the composite according to the invention can also serve as a bird-protecting element.

In addition, the composite panes according to the invention can be used in the "overhead region" for roofing, e.g. of pedestrian zones, galleries, winter gardens or penthouses.

Another application is to glazing, e.g., of bannisters or bus shelters.

BRIEF DESCRIPTION OF THE DRAWINGS

Embodiments of the invention will now be explained in further detail with reference to the accompanying drawings, in which:

FIG. 5 is a perspective view, partly in section, of a fifth embodiment of a pane panel according to the invention, concealed details being shown partly by broken lines.

DETAILED DESCRIPTION OF PREFEFFED EMBODIMENTS OF THE INVENTION

Figure 1:
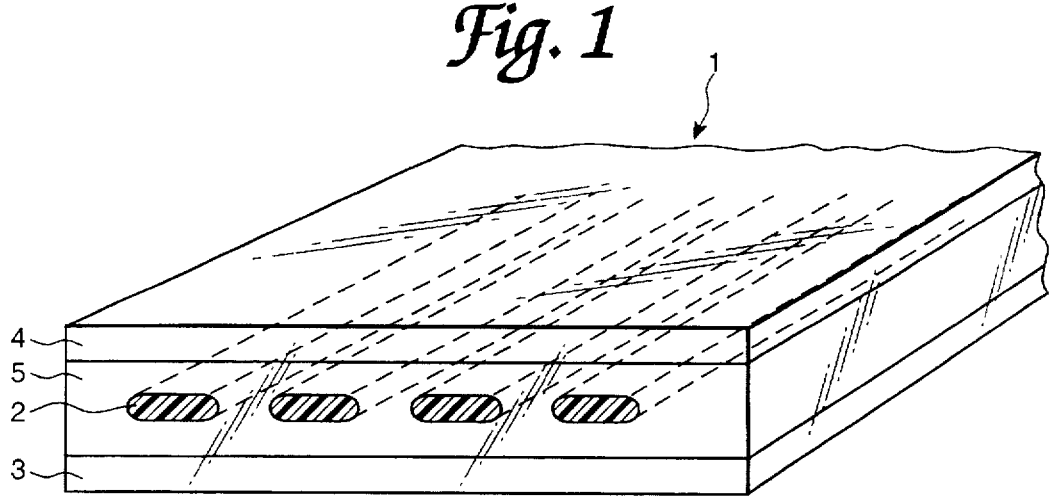
FIG. 1 is a perspective view, partly in section, of a first embodiment of a pane panel according to the invention, concealed details being shown partly by broken lines.

FIGS. 1 to 5 show a flameproof transparent pane panel 1 according to the invention. As shown in all the drawings, it has a core in the form of a plastic pane 5 which is embedded between two glass panes 3 and 4 and which cooperates therewith to form a composite pane 1. The glass panes 3 and 4 can be made of different or the same materials. Filamentary or flat plastic structures 2 are embedded in the plastic core pane to serve as support elements 5.

Figure 2:
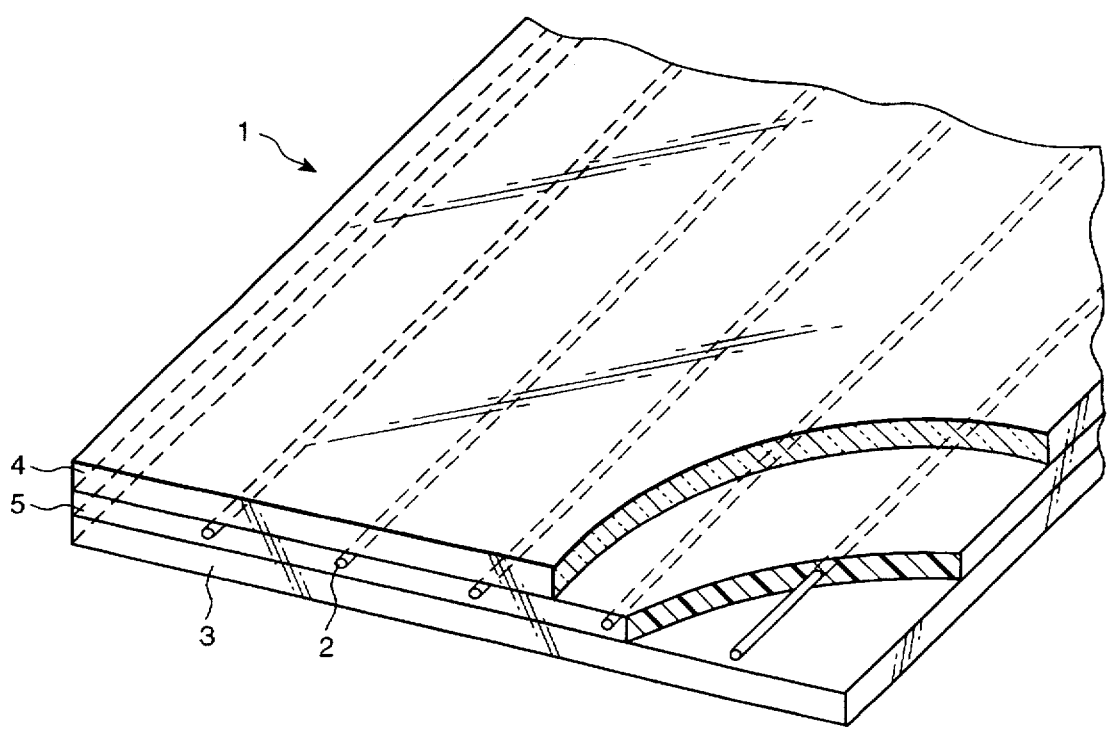
FIG. 2 is a perspective view, partly in section, of a second embodiment of a pane panel according to the invention, concealed details being shown partly by broken lines.
Figure 3:
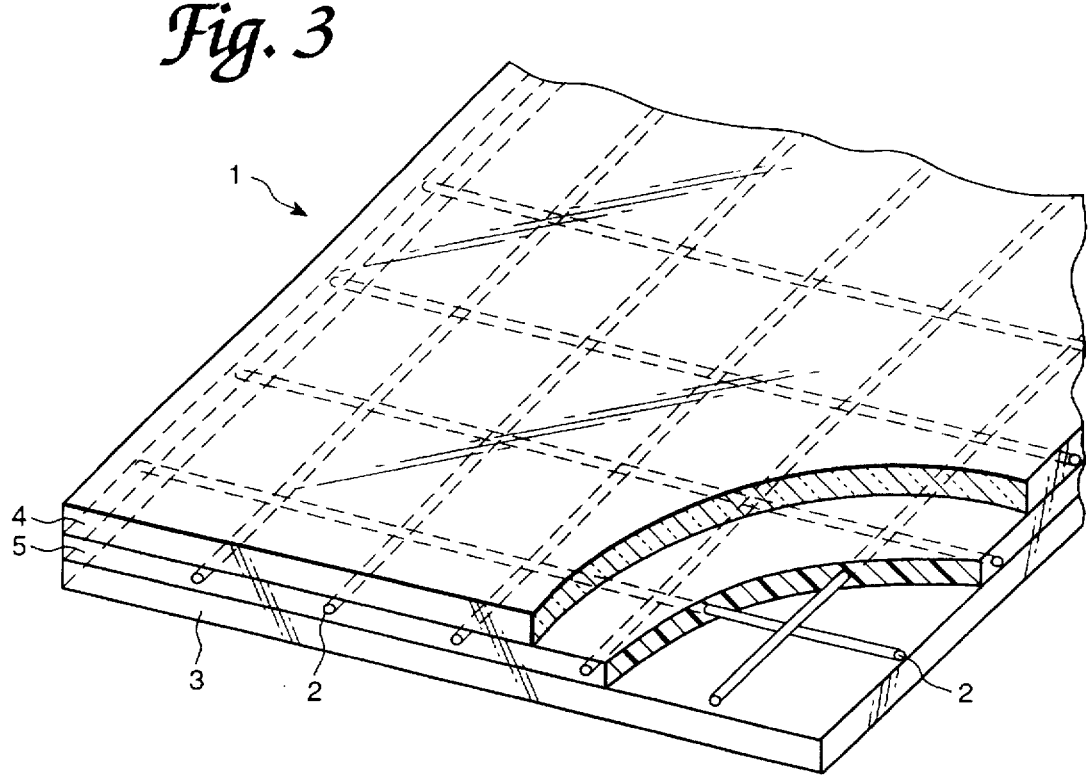
FIG. 3 is a perspective view, partly in section, of a third embodiment of a pane panel according to the invention, concealed details being shown partly by broken lines.

FIG. 1 shows filamentary plastic layers 2 produced by co-extrusion and disposed in the plastic pane core 5 during manufacture thereof. In FIG. 5, plastic strips 2 are embedded in the core 5 by a casting method. FIG. 2 shows the inserted elements 2 in the form of threads extending parallel to one another, whereas FIG. 3 illustrates a case where the threads 2 intersect to form a lattice, the longitudinal fibres being substantially parallel to one another and disposed at about 90° to the transverse fibres, which are likewise parallel. The threads 2 can be disposed in two planes, so that the longitudinal threads extend above or below the transverse threads. However, the longitudinal threads may also be disposed alternately above and below the threads at right angles thereto.

Figure 4:
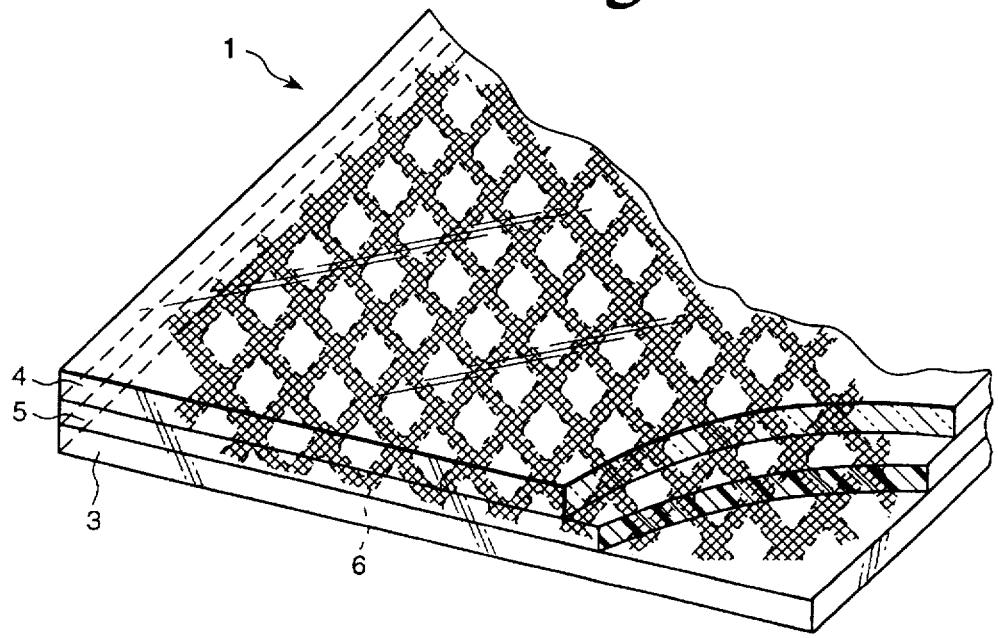
FIG. 4 is a perspective view, partly in section, of a fourth embodiment of a pane panel according to the invention, concealed details being shown partly by broken lines.

Finally, FIG. 4 shows use of a thread element 2 in the form of a net-like structure 6.

Pane elements according to the invention can be manufactured, e.g., as follows:

Two panes measuring 3000×2000×8 mm and made of ESG (single-pane safety glass) are spaced apart by means of a peripheral seal so as to leave a gap of 4 mm between the panes. Black polyamide fibres 2 mm thick with a spacing of 30 mm are disposed in the cavity so as to be parallel in the longitudinal direction (edge length 3000 mm). Before the two glass panels are fitted together, the threads are exactly positioned by securing to the peripheral seal.

The cavity between the panes is then filled, through an opening in the seal, with a low-viscosity colourless composite resin based on MMA and various acrylate and methacrylate comonomers, e.g. Degalan S696 or S700. Polymerisation of the cold-setting composite resin is started shortly before, by adding activators and accelerators based on organic peroxides and primers in the form of organosilane compounds.

The panes are filled by being placed in a slightly sloping position. Polymerisation, which is complete after about 1½ hours, occurs when the panels are horizontal.

Test 1:

Production of noise-prevention elements from "single-pane safety glass (ESG)" compounded with "Naftolan S 696-M" resin (PMMA resin)+polyamide fibres.

Materials used:
single-plane safety glass: 2000×2000×6 mm
polyamide fibres: diameter about 2 mm
butyl rubber sealing strip with 3 mm core
Naftolan S 696-M resin (12 kg)
Catalysts K 91 and K 66

Fusion adhesive (MMA-resistant)
Butyl rubber strip, coated with aluminium on one side
Resin formulation:
100 parts Naftolan S 696-M
2 parts K 91
1 part K 66
Manufacture:

An ESG pane was placed on an adjustable laboratory table and cleaned with isopropanol. The polyamide cords, tensioned on a tensioning device, were then placed on the ESG pane (spacing between cords=approx. 30 mm).

Next the butyl rubber sealing strip was applied and the second ESG pane was placed on top.

As an additional seal, the resulting intermediate space was sealed with fusion adhesive and with a butyl rubber strip.

The resulting pocket was filled with the resin, which was then left to harden.

Breaking test:

The said noise-prevention element was placed on four wooden trestles (height about 860 mm), without being tensioned or secured. A wooden pallet measuring 1200× 1200×140 (L×B×H) was placed on the ground to protect it.

A 300 kg cylindrical metal weight was dropped on to the middle of the noise-prevention element from a height of 1000 mm. The point of impact of the metal weight was marked with a radius.

Observations on test:

When struck by the metal weight, the single-pane safety glass shattered in the typical form of small glass splinters. These splinters were completely retained by the resin.

The panel also had a crack extending from the edge, but not resulting in any loose fragment.

Test 2:

Production and testing of noise-prevention elements made of float glass composite with PMMA resin and polyamide threads In contrast to claim 1, non-hardened float glass was used instead of ESG.

The noise-prevention panel made with float glass was secured in a metal frame and the frame was mounted on a trestle.

The metal weight fell through the clamped panel, without producing any loose splinters. As a result of the resin parts held by the polyamide threads, the retention of splinters was extended to the mineral glass components of the noise-prevention panel.

What is claimed is:

1. A fireproof transparent pane panel comprising:
   a plastic pane core disposed between panes of inorganic glass to form a composite pane; and
   internal plastic support elements embedded within the core.

2. A pane panel according to claim 1, wherein the plastic pane core is one formed in a discontinuous casting process.

3. A pane panel according to claim 1, wherein the plastic pane core is one formed in a process of continuous coextrusion of at least two incompatible thermoplastics.

4. A pane panel according to any one of claims 1–3, wherein the plastic support elements are threads having a diameter of 1 to 5 mm, the spacing between threads does not exceed 100 mm and the density of threads per unit area is between 2.5 to 25%.

5. A pane panel according to claim 4, wherein the thickness of the plastic pane core is in the range of 4 to 40 mm.

6. A pane panel according to any one of claims 1–3, wherein the plastic support elements are monofilament threads made of at least one of polyamide and polypropylene.

7. A pane panel according to claim 4, wherein the plastic support elements are monofilament threads made of at least one of polyamide and polypropylene.

8. A pane assembly according to claim 7, wherein the thickness of the plastic pane core is in the range of 5 to 40 mm.

9. A pane panel according to any one of claims 1-3, wherein the support elements are made from a plastic having a light transmission factor of 0 to 65%.

10. A pane panel according to claim 4, wherein the support elements are made from a plastic having a light transmission factor of 0 to 65%.

11. A panel panel according to claim 5, wherein the support elements are made from a plastic having a light transmission factor of 0 to 65%.

12. A pane panel according to any one of claims 1-3, wherein the plastic pane core is an acrylic glass.

13. A pane panel according to claim 4, wherein the plastic pane core is an acrylic glass.

14. A pane panel according to claim 5, wherein the plastic pane core is an acrylic glass.

15. A pane panel according to claim 12, wherein the support elements are polyamide fibres.

16. A pane panel according to claim 13, wherein the support elements are polyamide fibres.

17. A pane panel according to claim 14 wherein the support elements are polyamide fibres.

18. A pane panel according to claim 6, wherein said threads are arranged in a lattice.

19. A pane panel according to claim 7, wherein said threads are arranged in a lattice.

20. A pane panel according to claim 8, wherein said threads are arranged in a lattice.

21. A pane panel according to claim 15, wherein said fibres are arranged in a lattice.

22. A pane panel according to claim 16, wherein said fibres are arranged in a lattice.

23. A pane panel according to claim 17, wherein said fibres are arranged in a lattice.

24. A pane panel according to any one of claims 1-3, wherein said inorganic glass panes are of different materials.

25. A pane panel according to claim 4, wherein said inorganic glass panes are of different materials.

26. A pane panel according to claim 5, wherein said inorganic glass panes are of different materials.

27. A pane panel according to claim 8, wherein said inorganic glass panes are of different materials.

28. A pane unit according to claim 9, wherein said inorganic glass panes are of different materials.

29. A pane panel according to any one of claims 1-3, wherein at least one of said inorganic glass panes is a single-pane safety glass.

* * * * *

UNITED STATES PATENT AND TRADEMARK OFFICE
CERTIFICATE OF CORRECTION

PATENT NO. : 5,794,403
DATED : August 18, 1998
INVENTOR(S) : Oberländer et al.

It is certified that error appears in the above-identified patent and that said Letters Patent is hereby corrected as shown below:

TITLE PAGE, ITEM [73] Assignee: Please change assignee from "Degussa Aktiengesellschaft" to --Agomer GmbH--.

Signed and Sealed this

Twenty-fourth Day of November, 1998

Attest:

BRUCE LEHMAN

Attesting Officer

Commissioner of Patents and Trademarks